United States Patent

Carvalho Marques

(10) Patent No.: US 7,874,584 B2
(45) Date of Patent: Jan. 25, 2011

(54) SEALING PATCH FOR THE VENTILATION HOLE OF A NON-SILICONIZED CUSHION OF AN AIRBAG MODULE

(75) Inventor: Alexandre José Carvalho Marques, Vilanova de Cerveira (PT)

(73) Assignee: Dalphi Metal España, Madrid (ES)

(*) Notice: Subject to any disclaimer, the term of this patent is extended or adjusted under 35 U.S.C. 154(b) by 164 days.

(21) Appl. No.: 12/157,201

(22) Filed: Jun. 6, 2008

(65) Prior Publication Data

US 2009/0001697 A1    Jan. 1, 2009

(30) Foreign Application Priority Data

Jun. 22, 2007   (EP)   ................... 07381048

(51) Int. Cl.
*B60R 21/276*   (2006.01)
(52) U.S. Cl. ...................... 280/739; 280/736
(58) Field of Classification Search ................ 280/739, 280/740, 736; 277/315
See application file for complete search history.

(56) References Cited

U.S. PATENT DOCUMENTS

| | | | |
|---|---|---|---|
| 3,573,885 A | | 4/1971 | Brown et al. |
| 3,879,057 A | | 4/1975 | Kawashima et al. |
| 4,097,065 A | | 6/1978 | Okada et al. |
| 4,360,223 A | * | 11/1982 | Kirchoff .................... 280/729 |
| 5,018,761 A | | 5/1991 | Henseler |
| 5,219,179 A | * | 6/1993 | Eyrainer et al. ............. 280/739 |
| 5,704,639 A | * | 1/1998 | Cundill et al. .............. 280/739 |
| 5,725,244 A | * | 3/1998 | Cundill ...................... 280/739 |
| 5,839,755 A | * | 11/1998 | Turnbull .................... 280/739 |
| 5,902,672 A | * | 5/1999 | Swoboda et al. ............ 442/203 |
| 6,017,057 A | * | 1/2000 | O'Docherty ................ 280/739 |
| 6,056,318 A | * | 5/2000 | Braunschadel ............. 280/739 |
| 7,413,219 B2 | * | 8/2008 | Neira Sarmiento et al. .. 280/739 |
| 2006/0197326 A1 | * | 9/2006 | Sarmiento et al. ........... 280/739 |
| 2007/0246922 A1 | * | 10/2007 | Manssart .................... 280/739 |
| 2008/0277912 A1 | * | 11/2008 | Denys et al. ................ 280/739 |
| 2009/0001697 A1 | * | 1/2009 | Carvalho Marques ....... 280/736 |
| 2009/0218797 A1 | * | 9/2009 | Perez Garcia ............... 280/742 |

FOREIGN PATENT DOCUMENTS

EP   1022198 A1 *  7/2000

* cited by examiner

*Primary Examiner*—Paul N Dickson
*Assistant Examiner*—Karen A Beck
(74) *Attorney, Agent, or Firm*—Ladas & Parry LLP

(57) ABSTRACT

The invention relates to an airbag module for protecting an occupant of a vehicle in the event of a collision, comprising a cushion (11) that can expand with the gas provided by a generator with at least one ventilation hole (13) sealed with a patch (21) including a silicone membrane (23) intended to break due to the effect of the internal pressure in the cushion (11) so as to allow gas discharge, in which the fabric of the cushion (11) does not have a silicone coating, the patch (21) is formed by said membrane (23) joined at its edges to two pieces (25, 27) of fabric and fixed to the cushion (11) by means of a seam (31). The invention also comprises a process for manufacturing the cushion (11).

5 Claims, 1 Drawing Sheet

US 7,874,584 B2

SEALING PATCH FOR THE VENTILATION HOLE OF A NON-SILICONIZED CUSHION OF AN AIRBAG MODULE

FIELD OF THE INVENTION

The present invention relates to an airbag module intended for protecting an occupant of a vehicle in the event of a collision and particularly a sealing patch for the ventilation hole of a non-siliconized cushion.

The present invention can be applied to the automobile industry in general, and particularly to the field dedicated to manufacturing and/or installing and/or assembling auxiliary equipment and active safety devices in vehicles.

BACKGROUND OF THE INVENTION

Airbag modules consist of casings in which a folded cushion is fixed, which cushion quickly inflates by means of a gas produced by a generator when specific sensing devices detect a vehicle collision. The cushion thus deploys in front of the driver or a passenger, depending on its location, and prevents their bodies from hitting against any part of the vehicle.

To prevent the cushion from being too stiff when it comes into contact with the driver or passenger, acting as if it were a ball and making the rebound effect cause an excessive impact in the person for whom it deploys, they have been provided with a ventilation hole used to reduce the internal pressure of the cushion and, consequently, the possibility of causing injuries when actuated.

At the same time, several means for sealing the gas discharge hole have been used to achieve better control of the internal pressure of the cushion than the one provided only by the variation of the hole size.

Using a sealing patch achieves that the gas does not come out immediately through the discharge hole but rather when the patch breaks.

The art has proposed different types of patches with different means for controlling their breaking according, to a greater or lesser extent, to a specific resistance to the gas pressure inside the cushion. The presence of the necessary gas pressure for the cushion to carry out its protective function is thus made compatible with the guarantee that the gas pressure will not achieve an excessive value, with risks for the people for whom the cushion deploys.

Fabric patches such as those described in patent documents U.S. Pat. No. 3,879,057, U.S. Pat. No. 4,097,065 and U.S. Pat. No. 5,018,761 have been proposed, said patches not being successful due to the lack of breaking pressure uniformity as a result of their nature.

Nor have plastic patches such as those proposed in patent document U.S. Pat. No. 3,573,885 been successful because of the difficulty in controlling their breaking pressure due to the variability of mechanical characteristics of plastic at different temperatures.

In this sense, patches made of an elastic material such as silicone are currently considered the most suitable because of the good stability of the material in temperature changes. Patches with different shapes and thicknesses are used to control the breaking pressure for the purpose of optimizing their conditions for holding back the occupant of the vehicle they are intended for. A good example to that respect is the one described in patent application EP 1022198.

The cushions to which said patches are fixed must be coated with silicone to facilitate fixing the patch to the cushion by means of a gluing process, which involves a drawback because this coating increases the cost of the cushion and reduces its packaging capacity.

The present invention aims to solve this drawback.

SUMMARY OF THE INVENTION

An object of the present invention is to provide an airbag module with a cushion made with a fabric without any silicone coating including at least one ventilation hole sealed by a silicone membrane or a similar elastic material.

Another object of the present invention is to provide a process for manufacturing cushions for airbag modules with ventilation holes sealed by a silicone membrane facilitating the incorporation of the sealing patch for the cushion.

These and other objectives are achieved, in a first aspect, by providing an airbag module for protecting an occupant of a vehicle in the event of a collision, comprising a cushion that can expand with the gas provided by a generator with at least one ventilation hole sealed with a patch including a silicone membrane intended to break due to the effect of the internal pressure in the cushion so as to allow the gas discharge, in which the fabric of the cushion does not have a silicone coating, the patch is formed by said membrane joined at its edges to an upper piece of one fabric and to a lower piece of another fabric, whereby the patch will be placed on the cushion and fixed thereto by means of a seam.

In a second aspect, said objectives are achieved by providing a process for manufacturing a cushion for an airbag module with at least one ventilation hole sealed with a patch including a silicone membrane comprising the following steps: providing the panels necessary for manufacturing a cushion made of a fabric without a silicone coating; providing a patch with said membrane arranged between two pieces of fabric; fixing said patch to the cushion by means of a seam, sealing the ventilation hole.

These and other features and advantages of the invention will be more clearly explained based on the detailed description of the embodiments of the invention which will be carried out below for illustrative and non-limiting purposes in relation to the attached drawings.

DETAILED DESCRIPTION OF THE INVENTION

Figures 1A, 1B:
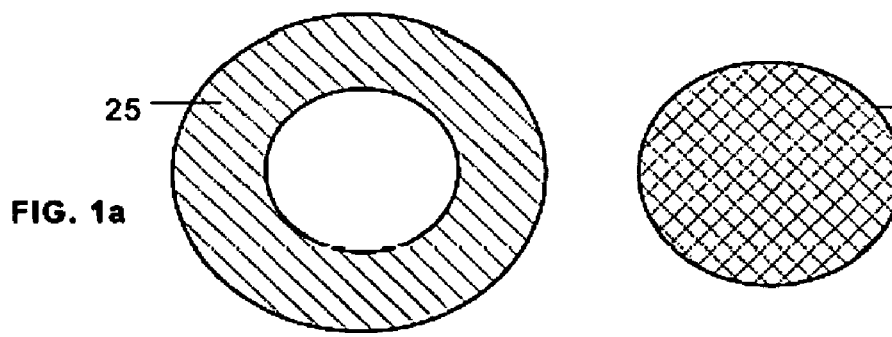
FIGS. 1a, 1b and 1c are plan views of the three pieces forming the sealing patch for the ventilation hole of the cushion of the airbag module according to the present invention.
Figure 1C:
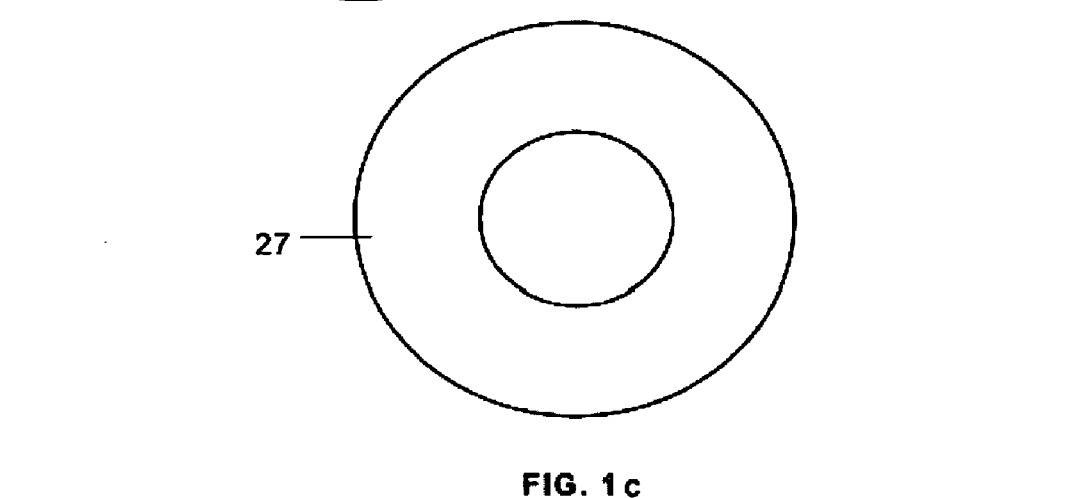
Figure 2:
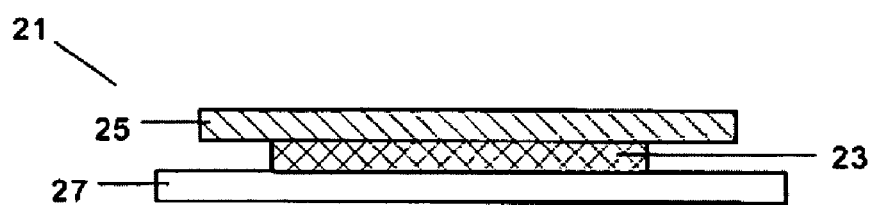
FIG. 2 is a cross-sectional view of the sealing patch for the ventilation hole of the cushion of the airbag module according to the present invention.
Figure 3:
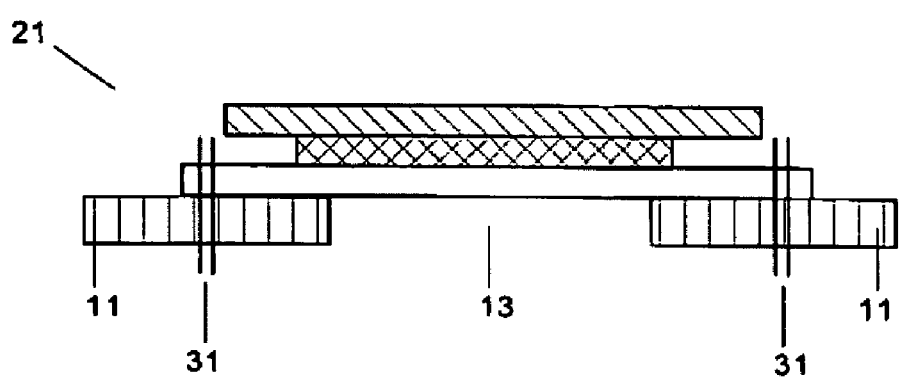
FIG. 3 is a cross-sectional view of the sealing patch for the ventilation hole sewed to the cushion of the airbag module according to the present invention.

In a preferred embodiment of the invention the patch 21 is formed by joining a silicone membrane 23, an upper piece 25 of calendered fabric and a lower piece 27 of fabric coated with silicone on the face adjacent to the membrane 23.

The membrane 23 has a circular shape and pieces 25 and 27 have an annulus shape with an outer diameter larger than that of the membrane 23 and with an inner diameter smaller than that of the membrane 23.

The patch 21 is joined to the cushion 11 by means of seams 31 traversing its lower piece 27 but not the membrane 23. In another embodiment, the seams 31 would also include the upper piece 25.

A suitable process for manufacturing the patches 21 is the following: the membrane 23 is arranged on the piece 25 of calendered fabric (along its siliconized face) and the piece 27 of coated fabric is arranged on the membrane (along its siliconized face). The assembly is subjected to a vulcanizing press during the time and at the temperature necessary for it to vulcanize.

The following materials would be used in a specific embodiment of the invention:

Cushion 11: 470 dtex 205×195 (uncoated fabric with Pa 6.6).
Silicone membrane 23: PTO 500 mbar.
Upper piece 25: 470 dtex 220×160+130/25.
Lower piece 27: 470 dtex 180×180+35 g of silicone (coated fabric Pa 6.6).

For its lower part, in a specific embodiment of the invention, the seam 31 for joining the patch 21 to the cushion 11 is a lock-stitch with 30-35 ppd Pa 6.6 20/3 thread.

An advantage of the present invention is that it allows using non-siliconized fabrics for manufacturing cushions with the corresponding cost reduction.

Another advantage of the present invention is that it allows reducing the folded cushion volume by using non-siliconized fabrics.

Another advantage of the present invention is that the manufacture of different patches for different types of cushions can be standardized, facilitating their distribution and use as well as reducing their costs.

Another advantage of the present invention is that it allows an optimization of the process for manufacturing the cushions given that, since the manufacture of the cushions requires the use of seam means, the joining of the patch to the cushion by means of a seam is simpler than joining it by other means, and particularly, by chemical means.

Even though several embodiments of the invention have been described and shown, it is obvious that modifications comprised within the scope thereof can be introduced, and said invention must not be considered to be limited to said embodiments, but rather to the content of the following claims

The invention claimed is:

1. An airbag module for protecting an occupant of a vehicle in the event of a collision, comprising a cushion (11) that can expand with the gas provided by a generator with at least one ventilation hole (13) sealed with a patch (21) including a silicone membrane (23) intended to break due to the effect of the internal pressure in the cushion (11) so as to allow gas discharge, wherein:
   a) the fabric of the cushion (11) does not have a silicone coating;
   b) the patch (21) is formed by said membrane (23) joined at its edges to an upper piece (25) of fabric and to a lower piece (27) of fabric whereby the patch (21) is placed on the cushion (11); and
   c) the patch (21) is fixed to the cushion (11) by means of a seam (31).

2. An airbag module according to claim 1, wherein the fabric of the upper piece (25) of the patch (21) is a calendered fabric and the fabric of the lower piece (27) is a fabric including a silicone coating on the face adjacent to the membrane (23).

3. An airbag module according to claim 2, wherein the membrane (23) has a circular shape, the upper and lower pieces (25, 27) have an annulus shape, their inner diameter being smaller than that of the membrane (23) and their outer diameter being larger than that of the membrane (23), and the patch (21) is fixed to the cushion (11) by means of a seam (31) on at least said lower piece (27) along its outer edge without traversing the membrane (23).

4. An airbag module according to claim 1, wherein the membrane (23) has a circular shape, the upper and lower pieces (25, 27) have an annulus shape, their inner diameter being smaller than that of the membrane (23) and their outer diameter being larger than that of the membrane (23), and the patch (21) is fixed to the cushion (11) by means of a seam (31) on at least said lower piece (27) along its outer edge without traversing the membrane (23).

5. A process for manufacturing a cushion (11) for an airbag module with at least one ventilation hole (13) sealed with a patch (21) including a silicone membrane (23), comprising the following steps:
   a) providing panels necessary for manufacturing the cushion (11) made with a fabric without a silicone coating;
   b) providing a patch (21) with said membrane arranged between two pieces (25, 27) of fabric; and
   c) fixing said patch (21) to the cushion (11) by means of a seam (31), sealing the ventilation hole (13).

* * * * *

UNITED STATES PATENT AND TRADEMARK OFFICE
CERTIFICATE OF CORRECTION

| | | |
|---|---|---|
| PATENT NO. | : 7,874,584 B2 | Page 1 of 1 |
| APPLICATION NO. | : 12/157201 | |
| DATED | : January 25, 2011 | |
| INVENTOR(S) | : Alexandre José Carvalho Marques | |

It is certified that error appears in the above-identified patent and that said Letters Patent is hereby corrected as shown below:

Title page, Item (73), assignee: after "España" add --S.A.--.

Signed and Sealed this
Fifth Day of April, 2011

David J. Kappos
*Director of the United States Patent and Trademark Office*